(12) United States Patent
Toksvig et al.

(10) Patent No.: US 7,595,806 B1
(45) Date of Patent: *Sep. 29, 2009

(54) METHOD AND SYSTEM FOR IMPLEMENTING LEVEL OF DETAIL FILTERING IN A CUBE MAPPING APPLICATION

(75) Inventors: Michael J. M. Toksvig, Palo Alto, CA (US); William P. Newhall, Jr., San Francisco, CA (US); Paul S. Heckbert, Pittsburgh, PA (US)

(73) Assignee: NVIDIA Corporation, Santa Clara, CA (US)

( * ) Notice: Subject to any disclaimer, the term of this patent is extended or adjusted under 35 U.S.C. 154(b) by 360 days.

This patent is subject to a terminal disclaimer.

(21) Appl. No.: 10/911,462

(22) Filed: Aug. 3, 2004

(51) Int. Cl.
*G09G 5/00* (2006.01)
(52) U.S. Cl. .................. 345/587; 345/582; 345/584; 345/599
(58) Field of Classification Search .......... 345/587, 345/582, 584, 599
See application file for complete search history.

(56) References Cited

U.S. PATENT DOCUMENTS

| | | | |
|---|---|---|---|
| 5,170,152 A | 12/1992 | Taylor | |
| 5,313,567 A * | 5/1994 | Civanlar et al. | 345/424 |
| 5,384,912 A | 1/1995 | Ogrinc et al. | |
| 5,424,755 A | 6/1995 | Lucas et al. | |
| 5,461,423 A | 10/1995 | Tsukagoshi | |
| 5,544,292 A | 8/1996 | Winser | |
| 5,613,050 A | 3/1997 | Hochmuth et al. | |
| 5,710,577 A | 1/1998 | Laumeyer | |
| 5,831,623 A * | 11/1998 | Negishi et al. | 345/424 |
| 5,856,829 A | 1/1999 | Gray, III et al. | |
| 5,943,058 A | 8/1999 | Nagy | |
| 5,963,210 A | 10/1999 | Lewis et al. | |
| 6,028,608 A | 2/2000 | Jenkins | |
| 6,052,113 A | 4/2000 | Foster | |
| 6,160,557 A | 12/2000 | Narayanaswami | |
| 6,191,794 B1 | 2/2001 | Priem et al. | |
| 6,239,808 B1 | 5/2001 | Kirk et al. | |
| 6,337,744 B1 | 1/2002 | Kuroda | |
| 6,373,495 B1 | 4/2002 | Lin et al. | |
| 6,453,330 B1 | 9/2002 | Battle et al. | |
| 6,456,291 B1 | 9/2002 | Fowler | |
| 6,518,974 B2 | 2/2003 | Taylor et al. | |
| 6,525,729 B1 | 2/2003 | Akerman et al. | |
| 6,618,048 B1 | 9/2003 | Leather | |
| 6,618,049 B1 | 9/2003 | Hansen | |
| 6,664,960 B2 | 12/2003 | Goel et al. | |

(Continued)

OTHER PUBLICATIONS

Euh, J., Chittamuru, J., Burleson, W., Cordic Vector Interpolator for Power-Aware 3D Computer Graphics, Oct. 2002, IEEE Workshop on Signal Processing Systems, pp. 240-245.

*Primary Examiner*—Matthew C Bella
*Assistant Examiner*—Mike Rahmjoo (57) ABSTRACT

A method for implementing LOD (level of detail) filtering in a cube mapping application. The method includes accessing a first sample and a second sample for a cube map. A cube map path is computed between the first sample and the second sample. A distance is computed between the first sample and the second sample, wherein the distance is measured using the cube map path. LOD filtering is then implemented by using the distance between the first sample and the second sample.

20 Claims, 5 Drawing Sheets

U.S. PATENT DOCUMENTS

| | | |
|---|---|---|
| 6,711,603 B1 | 3/2004 | Takenaka |
| 6,745,336 B1 | 6/2004 | Martonosi et al. |
| 6,774,895 B1 | 8/2004 | Papakipos et al. |
| 6,807,620 B1 | 10/2004 | Suzuoki et al. |
| 6,891,548 B2 | 5/2005 | Alcorn et al. |
| 6,919,895 B1 | 7/2005 | Solanki et al. |
| 6,987,517 B1 * | 1/2006 | Donovan et al. ............ 345/582 |
| 6,999,100 B1 | 2/2006 | Leather et al. |
| 7,079,156 B1 | 7/2006 | Hutchins et al. |
| 7,117,238 B1 | 10/2006 | Foskett et al. |
| 7,190,366 B2 | 3/2007 | Hutchins et al. |
| 2002/0089512 A1 | 7/2002 | Slade et al. |
| 2002/0089701 A1 | 7/2002 | Lu et al. |
| 2002/0158865 A1 | 10/2002 | Dye et al. |
| 2003/0201994 A1 | 10/2003 | Taylor et al. |
| 2004/0125103 A1 * | 7/2004 | Kaufman et al. ............ 345/419 |
| 2004/0145589 A1 | 7/2004 | Prokopenko et al. |
| 2005/0066205 A1 | 3/2005 | Holmer |
| 2005/0231519 A1 | 10/2005 | Solanki et al. |
| 2006/0197768 A1 | 9/2006 | Van Hook et al. |

* cited by examiner

METHOD AND SYSTEM FOR IMPLEMENTING LEVEL OF DETAIL FILTERING IN A CUBE MAPPING APPLICATION

FIELD OF THE INVENTION

The field of the present invention relates to computer graphics. More particularly, the present invention relates to texture mapping operations in a computer graphics processing pipeline.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Texture mapping schemes were developed to enhance the images rendered by early graphics systems. Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. For example, the texture would be a picture of whatever material the designer was trying to convey (e.g., brick, stone, vegetation, wood, etc.) and would contain shading information as well as the texture and color to create the impression of a complex, 3D surface. Texture mapping is now widely established and widely implemented in most computer graphics systems.

"MIP mapping" is a texturing technique that is widely used to improve the visual quality of texture mapped graphics and animations. A primary objective of MIP mapping is to improve the overall impression of depth a viewer perceives in a given 3D scene. Since a display (e.g., CRT monitor, LCD monitor, etc.) is a flat 2D surface, it can be difficult to create the impression of depth.

A computer graphics rendering system achieves the impression of depth by displaying objects or scenery in a smaller size as distance from the camera viewpoint increases. However, when an object gets too small, the texture mapping methods are no longer able to display all its details. When this happens, some details are skipped, and visual information is lost. Rendering artifacts occur, such as, for example, jagged edges, interference patterns known as moiré, and the like. MIP mapping techniques are configured to address these problems.

MIP mapping prevents moiré and improves antialiasing by manipulating these texture maps. The texture maps generally contain all the surface details of the objects. MIP mapping adjusts the level of detail (LOD) of the texture maps by scaling and filtering a texture map into multiple versions before applying it to the wire frame model (e.g., referred to as LOD filtering). These versions are of varying resolution and detail. At close distances to the camera viewpoint, the texture map appears in its original full detail. For medium distances, a smaller texture (e.g., half the resolution of the original) is used. Even further distances display texture maps that are a quarter the resolution and so on. Each of these stages is known as a MIP map level. By choosing the appropriate texture map resolution and detail, MIP mapping ensures pixels do not get lost at further distances. Instead, properly averaged smaller versions of the original texture map are used.

Prior art MIP mapping is not well suited for cube mapping graphics applications. MIP mapping can adequately adjust the level of detail of a texture mapping operation in most of 3-D rendering applications. However, certain types of "environment" operations are not suited to prior art MIP mapping. Environment operations, or environment mapping, refer to those applications where details of an object's environment are reflected off of the object's surface. For example, a chrome object having a highly reflective surface should properly reflect its surrounding environment when rendered.

Cube mapping is one widely used mechanism for implementing environment mapping. Cube mapping is a well-known form of texture mapping that uses 3D normal vectors of an object's surface to index a cube map comprising six square 2D textures, arranged like the faces of a cube. Generally, the environment around an object is captured by six photographs (e.g. textures), each at an orthogonal 90 degree view from the others, thereby capturing a 360 degree view of the object's surroundings. Texels from the six texture maps are mapped onto the surface of the object to create the reflections of the environment.

Prior art MIP mapping is prone to LOD errors when used in cube mapping applications. Prior art MIP mapping uses point sampling techniques to determine when it is appropriate to shift from a higher level of detail texture map to a lower level of detail texture map, and vice versa. The point sampling generally detects the distance between adjacent samples to determine when a shift is required (e.g., by computing the Euclidean distance between samples). This point sampling technique however is not sufficiently accurate for cube mapping. This is due in part to the fact that the prior art point sampling techniques do not account for the 3D nature of the cube map (e.g., the six textures on the cube faces).

The prior art distance computing mechanism does not function properly when samples are on different faces of the cube. This results in incorrect LOD parameters used in the MIP mapping process, which in turn, results in rendering artifacts and rendering errors (e.g., aliased jagged edges, moiré interference patterns, etc.).

SUMMARY OF THE INVENTION

Embodiments of the present invention provide a method and system for implementing LOD (level of detail) filtering in cube mapping applications. Embodiments of the present invention are able to accurately determine sample distances and properly render environment cube mapping for an object, even when the samples are on different faces of the cube. The accurate sample distances yield correct LOD parameters, and thus, an accurate LOD filtering process or MIP mapping process, which in turn, eliminates rendering artifacts and errors (e.g., aliased jagged edges, moiré interference patterns, etc.).

In one embodiment, the present invention is implemented as a GPU (graphics processor unit) based method for implementing LOD (level of detail) filtering in a cube mapping application. The method includes accessing a first sample and a second sample for a cube map. A "cube map path" is computed between the first sample and the second sample (e.g., non-Euclidean distance path). A distance is computed between the first sample and the second sample, wherein the distance is measured using the cube map path. LOD filtering is then implemented by using the distance between the first sample and the second sample.

In one embodiment, the cube map path is computed by computing a plane defined by the first sample, the second sample, and a viewpoint for the cube map. A distance of a line between the first sample and the second sample is then computed, wherein the line is defined by the intersection of the plane with the cube map, and this distance is used to implement LOD filtering.

In another embodiment, the cube map path is computed by computing a path across at least one surface of the cube map between the first sample and the second sample (e.g., along the surface of one or more faces of the cube). A distance of the path is then computed, and this distance (e.g., the shortest path between the samples along the surface of the cube) is used to implement LOD filtering.

In another embodiment, the cube map path is computed by unfolding two adjacent faces of the cube map, wherein the first face includes the first sample and the second face includes the second sample. A distance of a line between the first sample and the second sample is then computed, wherein the line is defined across the unfolded first face and the unfolded second face of the cube map, and this distance is used to implement LOD filtering.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention provide a method and system for implementing LOD (level of detail) filtering in a cube mapping applications. Embodiments of the present invention are able to accurately determine sample distances and properly render environment cube mapping for an object even when the samples are on different faces of the cube. The accurate sample distances yield correct LOD parameters, and thus, an accurate LOD filtering process or MIP mapping process, which in turn, eliminates rendering artifacts and errors (e.g., aliased jagged edges, moiré interference patterns, etc.). Embodiments of the present invention and their benefits are further described below.

NOTATION AND NOMENCLATURE

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "compressing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform

Figure 1:
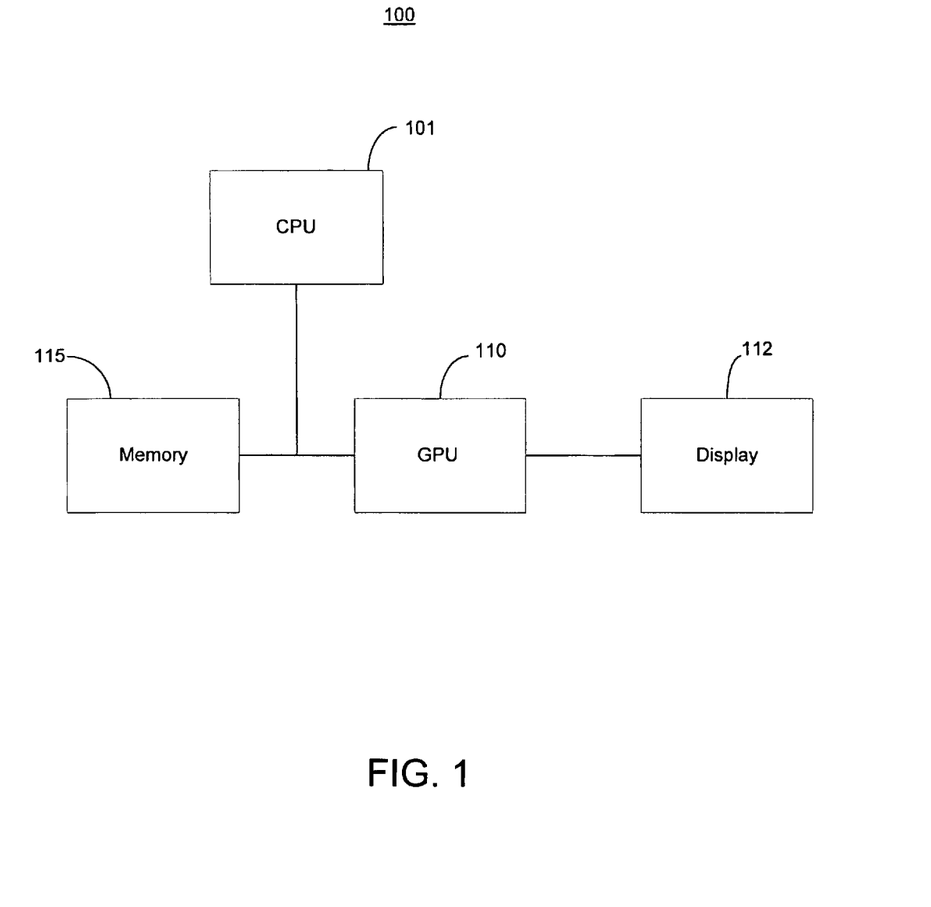
FIG. 1 shows a computer system in accordance with one embodiment of the present invention.

With reference now to FIG. 1, a computer system 100 in accordance with one embodiment of the present invention is shown. Computer system 100 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 100) and are executed by the CPU of system 100. When executed, the instructions cause the computer system 100 to implement the functionality of the present invention as described below.

In general, computer system 100 comprises at least one CPU 101 coupled to a system memory 115 and a graphics processor unit (GPU) 110 via one or more busses as shown. The GPU 110 is coupled to a display 112. As shown in FIG.

1, system 100 shows the basic components of a computer system platform that implements the functionality of the present invention. Accordingly, system 100 can be implemented as, for example, a desktop computer system or server computer system, having a powerful general-purpose CPU 101 coupled to a dedicated graphics rendering GPU 110. In such an embodiment, components would be included that are designed to add peripheral buses, specialized graphics memory and system memory, IO devices, and the like.

Additionally, it should be appreciated that although the GPU 110 is depicted in FIG. 1 as a discrete component, the GPU 110 can be implemented as a discrete graphics card designed to couple to the computer system via a graphics port (e.g., AGP port, or the like), as a discrete integrated circuit die (e.g., mounted directly on the motherboard), or as an integrated GPU included within the integrated circuit die of a computer system chipset (e.g., integrated within the Northbridge chip). Similarly, system 100 can be implemented as a set-top video game console device such as, for example, the Xbox®, available from Microsoft Corporation of Redmond Wash.

Figure 2:
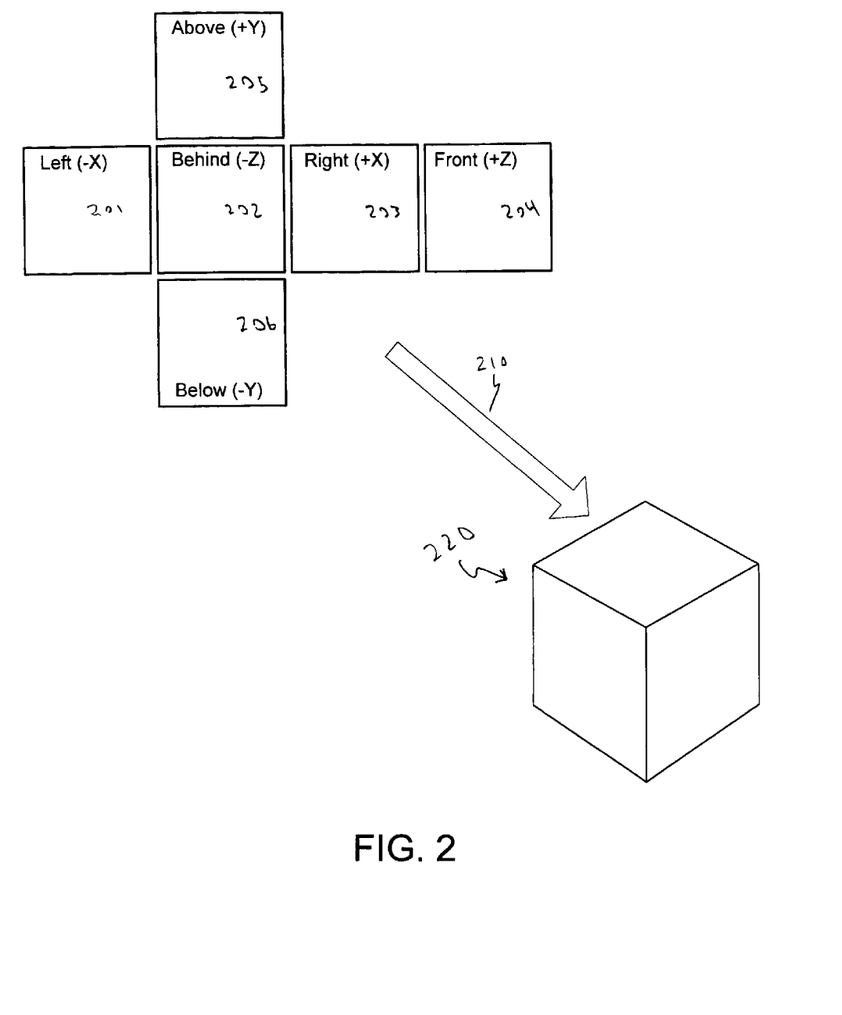
FIG. 2 shows a diagram depicting six individual texture maps that comprise a cube map in accordance with one embodiment of the present invention.

FIG. 2 shows a diagram depicting six individual texture maps 201-206 that comprise a cube map in accordance with one embodiment of the present invention. The textures 201-206 comprise two dimensional textures that correspond to a 360 degree view of the environment around a viewpoint centered within a cube 220. The viewpoint (not shown) is at the center of the cube 220 and the images comprise the view as seen through a 90 degree view frustum originating at the center. The six individual texture maps 201-206 are arranged as "faces" of the cube 220 as shown by the arrow 210.

As known by those skilled in the art, cube mapping is used for implementing environment mapping. Cube mapping uses 3D normal vectors of an object's surface, the object (not shown) being at the center of the cube 220, to index the six square 2D textures 201-206 of the faces of the cube 220. Texels from the texture maps 201-206 are mapped onto the surface of the object to create the reflections of the environment.

Figure 3:
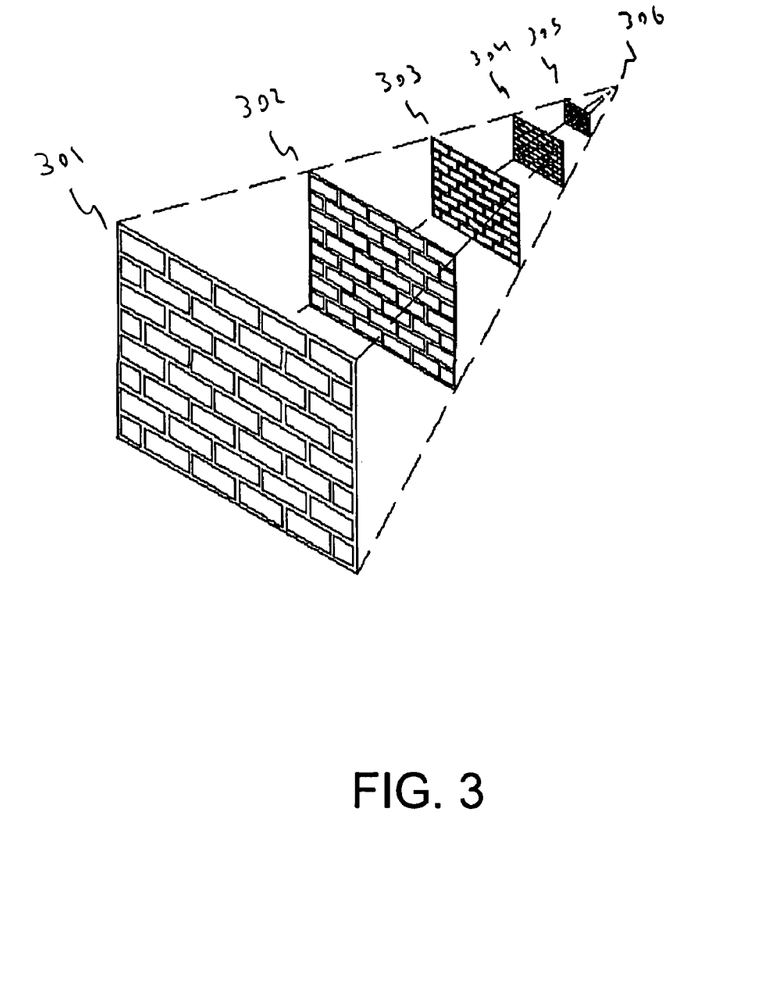
FIG. 3 shows a diagram of a MIP mapping operation in accordance with one embodiment of the present invention.

FIG. 3 shows a diagram of a MIP mapping operation in accordance with one embodiment of the present invention. As depicted in FIG. 3, six different resolution versions of a 2-D texture map (e.g., texture map 204 of FIG. 2) are shown.

As known by those skilled in the art, MIP mapping is a widely used type of LOD filtering. The LOD filtering is configured to prevent moiré interference patterns, aliasing, and rendering artifacts by scaling and filtering a full resolution texture map 301 into multiple lower resolution versions 302-306. The full resolution version 301 contains all the surface details of the objects. At close distances to the cube 220 viewpoint, the texture map 301 renders in its original full detail. As the distances increase, successively smaller resolution versions of the texture (e.g., versions 302-305) are used. By choosing the appropriate texture map resolution and detail, MIP mapping ensures that pixels do not get lost at further distances. Instead, properly averaged smaller versions of the original texture map are used. At the furthest distances, a single texel 306 is used. Each of these stages is known as a MIP map level. It should be noted that although FIG. 3 shows six versions 301-306, embodiments of the present invention can be implemented other numbers of versions (e.g., 3, 7, 10, etc.).

Figure 4:
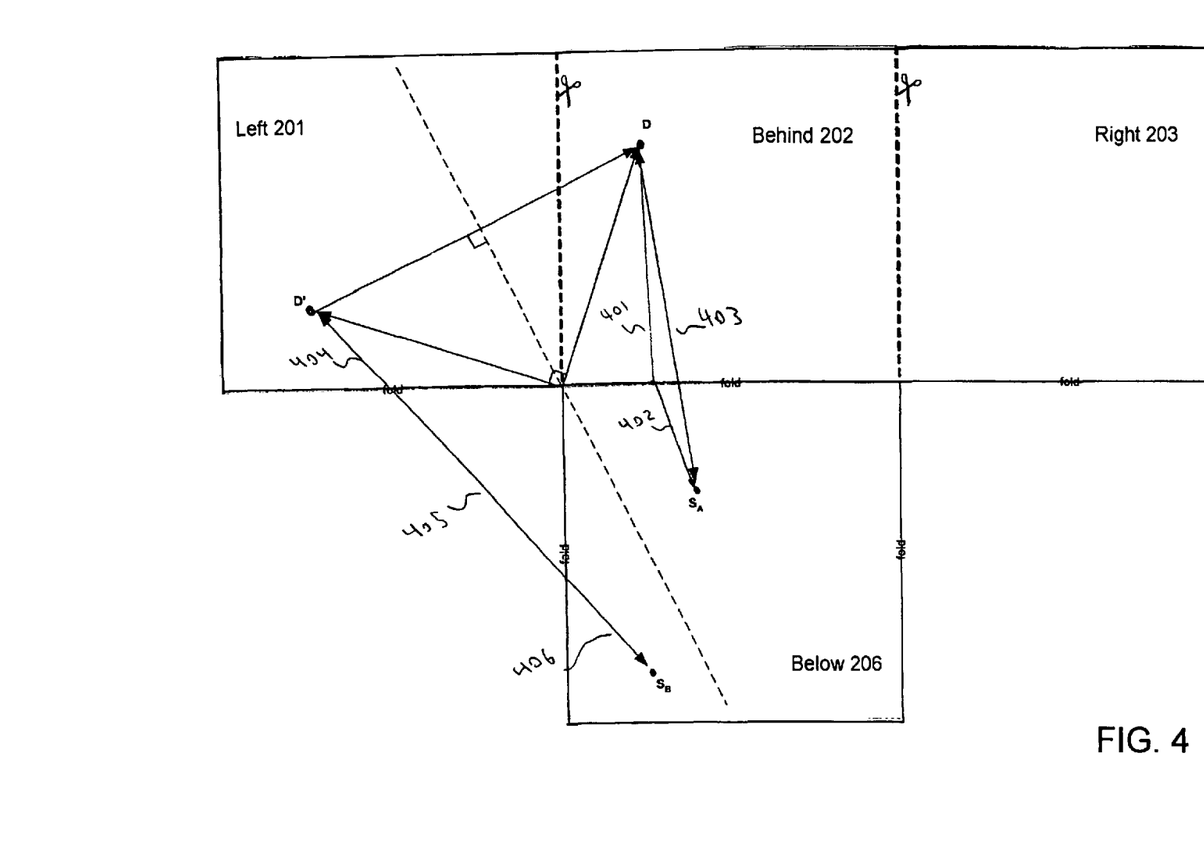
FIG. 4 shows a diagram depicting the operation of a LOD filtering process in accordance with one embodiment of the present invention.

FIG. 4 shows a diagram depicting the operation of a LOD filtering process in accordance with one embodiment of the present invention. As illustrated in FIG. 4, four faces of the cube 220 are shown (e.g., texture maps 201-203 and texture map 206).

Embodiments of the present invention are able to accurately determine the distance between samples of the texture map(s) even though those texture maps are wrapped around the faces of the cube (e.g., cube 220). As described above, accurately determining the distance between samples is the manner in which the LOD filtering process determines which MIP map level of a given texture to use.

In one embodiment, two adjacent pixels of a rendered image are used in the sampling process. These two pixels are mapped to points on the object at the center of the cube map. These points on the object have corresponding normal vectors which map to corresponding texels of the cube map. If the texels of the cube map are far apart, a lower resolution MIP map level is used. If the texels of the cube map are close together, a higher resolution MIP map level is used. Thus, the distance between the texels determines how fast the object is moving across the elements of the cube map (e.g., texture maps 201-206). In a typical implementation, 3, 4, or more samples are used (e.g., a quad), corresponding to three, four, or more adjacent pixels, as opposed to two samples. The additional number of samples (e.g., as opposed to just two samples) enables the calculation of multiple non-parallel distances that can more accurately indicate the partial derivatives across the screen.

In prior art implementations, Euclidean distance is used to determine the distance between the samples (e.g., the square root of $x^2+y^2+z^2$), Manhattan distance (e.g., the distance if a grid like pattern is followed), or the like. When measured using Euclidean means, the distances appear to be smaller than they really are, which prevents the MIP mapping level from shifting down to a coarser texture (e.g., from version 301 to version 302) when it needs to. When measured using Manhattan means, the distances appear larger than they really are. In contrast, embodiments of the present invention use more accurate methods to determine a more accurate "cube map distance" between samples of the cube map, particularly in those cases where the samples are on different faces of the cube map.

In one embodiment, the present invention computes the cube map distance by accessing the generated samples and computing a plane comprising texel A, texel B, and the viewpoint or center point of the cube map. This plane will project a line across one or more of the faces of the cube map between the two sample points (e.g., the two texels). In other words, the plane will "slice" the cube in such a manner as to indicate the "edge" with which the distance between the first sample and the second sample can be measured, (e.g., the plane intersection line). In a case where the faces of the cube map are "unfolded" and laid out flat, this line is shown by the line segments 401 and 402 between the sample points SA and D. The distance of this path is different from the prior art Euclidean distance and yields much more accurate LOD filtering results.

Figure 5:
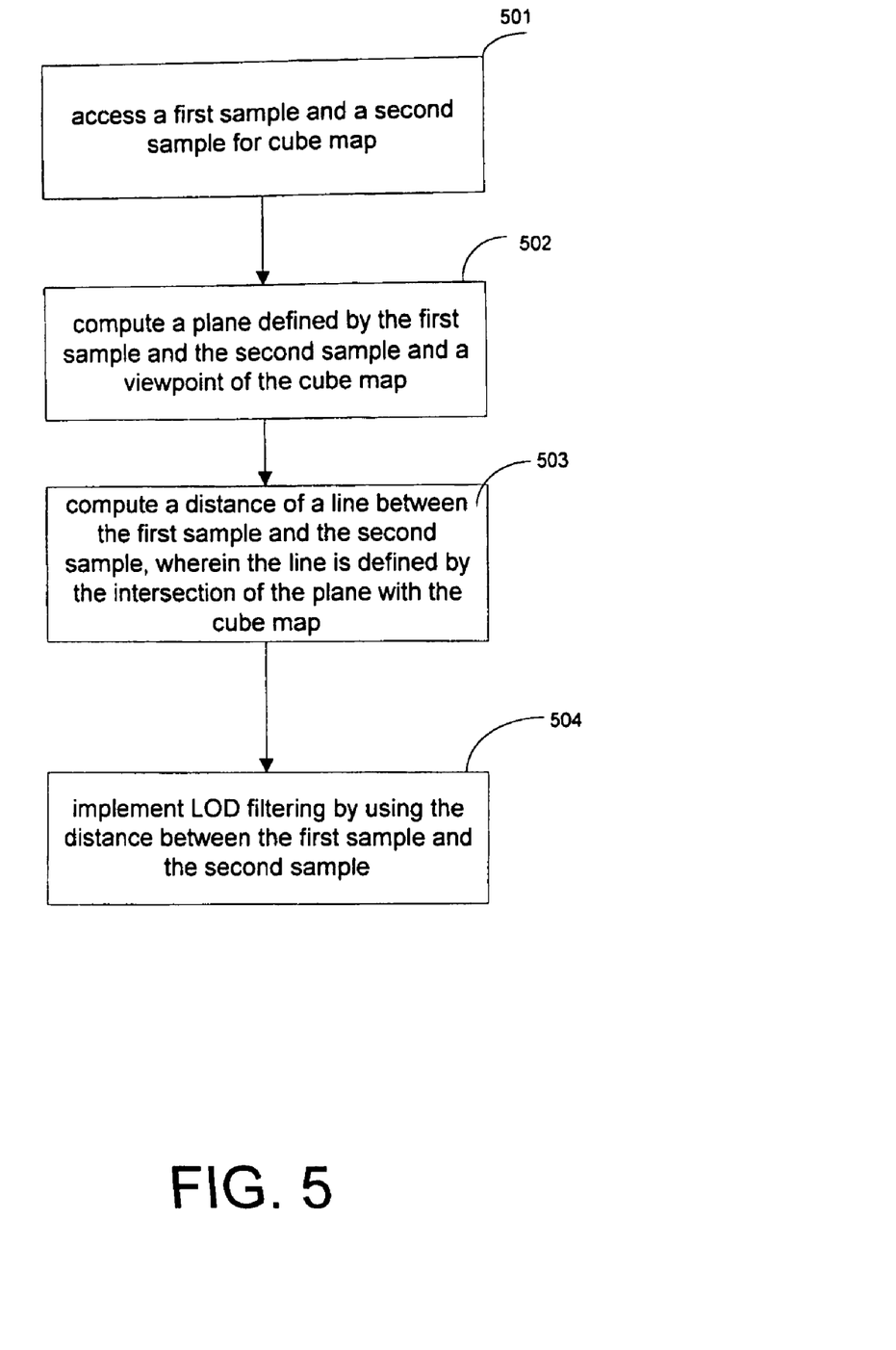
FIG. 5 shows a flow chart of the steps of a process in accordance with one embodiment of the present invention.

This embodiment is shown in the steps 501-504 of the flow chart of FIG. 5, where first and second samples of a cube map are accessed (e.g., step 501), a plane defined by the first and second samples and the viewpoint defined (e.g., step 502), the distance along the plane intersection line computed (e.g., step 503), and LOD filtering implemented using the measured distance between the samples (e.g., step 504).

In a second embodiment, as opposed to computing a plane intersection line as described above, the cube map distance is computed by computing a "shortest distance" path along the surface of the cube. In other words, with the faces (e.g., texture maps 201-206) oriented as the cube 220, a shortest path is computed from the first sample to the second sample, and the distance of this shortest path is used in the LOD filtering process as described above. It should be noted that the shortest path computation could involve measuring a distance along a line that traverses three or four cube faces. Additionally, the determination as to which path is the shortest path will vary depending upon how the cube faces are unfolded.

For example, in one embodiment, the cube map can be unfolded in multiple ways and the determination as to which path is the shortest path can be computed in parallel. This method would lend itself to parallel processing hardware and would execute quickly. In another embodiment, the cube can be sequentially unfolded in the multiple ways, where each unfolded way is tested sequentially, one after another. The shortest path is then chosen. This method would expend silicon area more economically (e.g. require fewer transistors) than the parallel method, however, it would not execute as quickly.

In a third embodiment, the cube map distance is computed by unfolding adjacent faces of the cube map and drawing a straight-line from the first sample to the second sample. The distance is measured along the straight line. This embodiment will handle all cases except those cases where the samples are on opposite faces (e.g., a sample on the left face 201 and on the right face 203). In such cases, the algorithm can simply return the coarsest textures (e.g., version 306) since the samples are so far apart. This scenario is shown in FIG. 4 as a line 403 between the sample SA and the sample D, and the line segments 404-406 between the samples SB and D' (e.g., the segment 405 is not used in the distance calculation, however).

Thus, each of the above embodiments have advantages over the prior art. Each of the embodiments yield better LOD filtering results than, for example, the prior art Euclidean methods. Additionally, each of the above embodiments is compatible with anisotropic filtering algorithms.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of implementing level of detail filtering, said method comprising:
   accessing a first sample of a cube map;
   accessing a second sample of said cube map;
   determining a cube map path between the first sample and the second sample, wherein said cube map path is coplanar with at least one surface of said cube map;
   computing a distance between the first sample and the second sample along the cube map path; and
   implementing LOD filtering using the distance between the first sample and the second sample.

2. The method of claim 1, wherein the first sample and the second sample are associated with texels of the cube map.

3. The method of claim 1 further comprising:
   using results of the LOD filtering, mapping information from the cube map onto an object to be rendered.

4. The method of claim 1, wherein the LOD filtering comprises MIP mapping operable to determine a respective MIP mapping level for said first sample and said second sample.

5. The method of claim 1, wherein the cube map comprises six respective texture maps arranged in a cube configuration.

6. The method of claim 1, wherein said determining said cube map path further comprises:
   determining a plane comprising the first sample, the second sample, and a viewpoint of the cube map; and
   determining at least one line defined by an intersection of said plane and said cube map, wherein said at least one line connects said first sample and said second sample.

7. The method of claim 6, wherein said computing a distance further comprises summing a length of said at least one line connecting said first sample and said second sample.

8. The method of claim 1 wherein said determining said cube map path further comprises:
   determining at least one line connecting said first sample to said second sample, wherein said at least one line comprises a shortest distance between said first sample and said second sample along at least one surface of said cube map.

9. The method of claim 1 wherein said determining said cube map path further comprises:
   unfolding a first face and a second face of the cube map, wherein the first face and the second face are adjacent faces of the cube map, wherein the first face comprises the first sample, and wherein the second face comprises the second sample; and
   determining a straight line connecting the first sample and the second sample, wherein the straight line crosses the unfolded first face and the unfolded second face of the cube map.

10. A computer system comprising a processor coupled to a memory, wherein the memory comprises computer readable code which when executed by the processor cause the computer system to perform a method of implementing LOD level of detail filtering, said method comprising:
    accessing a first sample of a cube map;
    accessing a second sample of said cube map;
    determining a cube map path between the first sample and the second sample, wherein said cube map path is coplanar with at least one surface of said cube map;
    computing a distance between the first sample and the second sample along the cube map path; and
    implementing LOD filtering using the distance between the first sample and the second sample.

11. The system of claim 10, wherein said method further comprises:
    using results of the LOD filtering, mapping information from the cube map onto an object to be rendered.

12. The system of claim 10, wherein said determining said cube map path further comprises:
    determining a plane comprising the first sample, the second sample, and a viewpoint of the cube map; and
    determining at least one line defined by an intersection of said plane and said cube map, wherein said at least one line connects said first sample and said second sample.

13. The system of claim 12, wherein said computing a distance further comprises summing a length of said at least one line connecting said first sample and said second sample.

14. The system of claim 10, wherein said determining said cube map path further comprises:
    determining at least one line connecting said first sample to said second sample, wherein said at least one line comprises a shortest distance between said first sample and said second sample along at least one surface of said cube map.

15. The system of claim 10 wherein said determining said cube map path further comprises:
   unfolding a first face and a second face of the cube map, wherein the first face and the second face are adjacent faces of the cube map, wherein the first face comprises the first sample, and wherein the second face comprises the second sample; and
   determining a straight line connecting the first sample and the second sample, wherein the straight line crosses the unfolded first face and the unfolded second face of the cube map.

16. A computer-readable medium comprising computer readable code which when executed by a processor of a computer system cause the computer system to perform a method of implementing LOD level of detail filtering in a cube mapping application, said method comprising:
   accessing a first sample of a cube map;
   accessing a second sample of said cube map;
   determining a cube map path between the first sample and the second sample, wherein said cube map path is coplanar with at least one surface of said cube map;
   computing a distance between the first sample and the second sample along the cube map path; and
   implementing LOD filtering using the distance between the first sample and the second sample.

17. The computer-readable medium of claim 16, wherein said determining said cube map path further comprises:
   determining a plane comprising the first sample, the second sample, and a viewpoint of the cube map; and
   determining at least one line defined by an intersection of said plane and said cube map, wherein said at least one line connects said first sample and said second sample.

18. The computer-readable medium of claim 17, wherein said computing a distance further comprises summing a length of said at least one line connecting said first sample and said second sample.

19. The computer-readable medium of claim 16, wherein said determining said cube map path further comprises:
   determining at least one line connecting said first sample to said second sample, wherein said at least one line comprises a shortest distance between said first sample and said second sample along at least one surface of said cube map.

20. The computer-readable medium of claim 16, wherein said determining said cube map path further comprises:
   unfolding a first face and a second face of the cube map, wherein the first face and the second face are adjacent faces of the cube map, wherein the first face comprises the first sample, and wherein the second face comprises the second sample; and
   determining a straight line connecting the first sample and the second sample, wherein the straight line crosses the unfolded first face and the unfolded second face of the cube map.

* * * * *